Dec. 5, 1939.   J. D. VAN VLIET   2,182,366
RESILIENT WING FOR AIRPLANES
Filed Oct. 8, 1937   6 Sheets-Sheet 1

INVENTOR
John D. Van Vliet

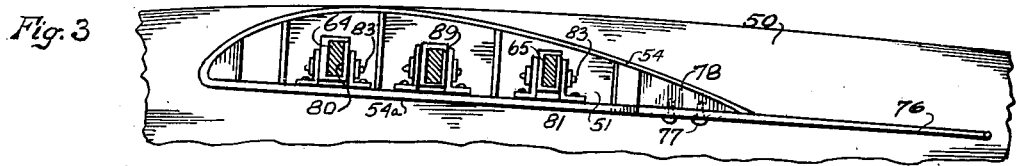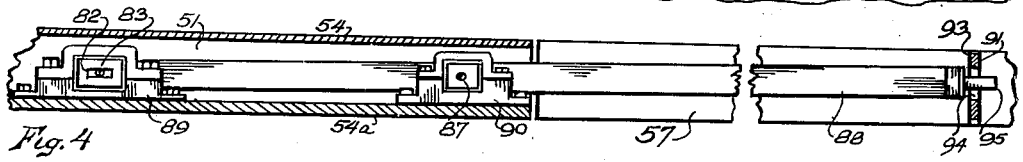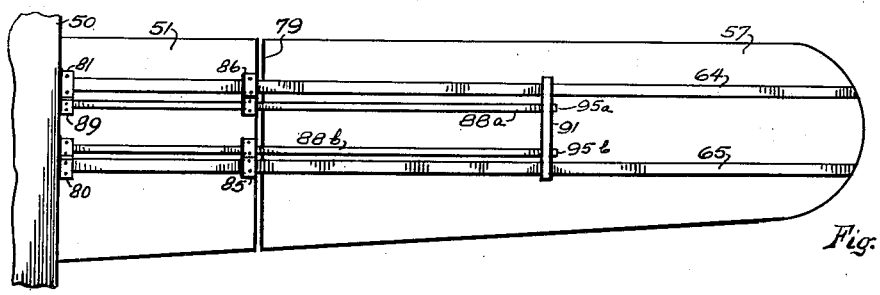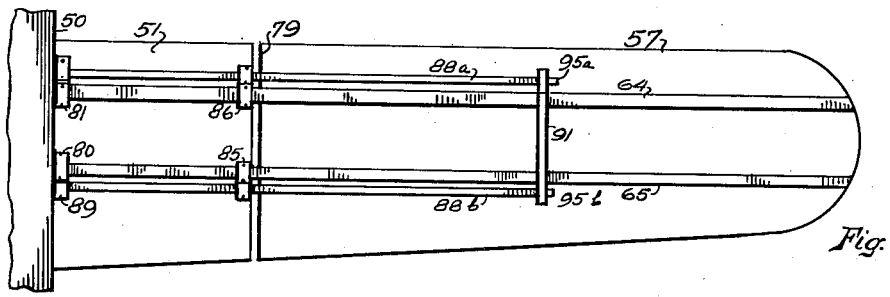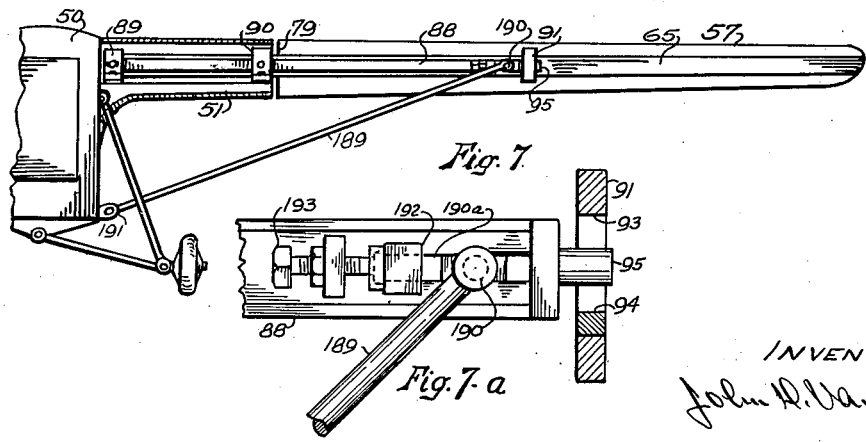

Dec. 5, 1939.   J. D. VAN VLIET   2,182,366
RESILIENT WING FOR AIRPLANES
Filed Oct. 8, 1937   6 Sheets-Sheet 3
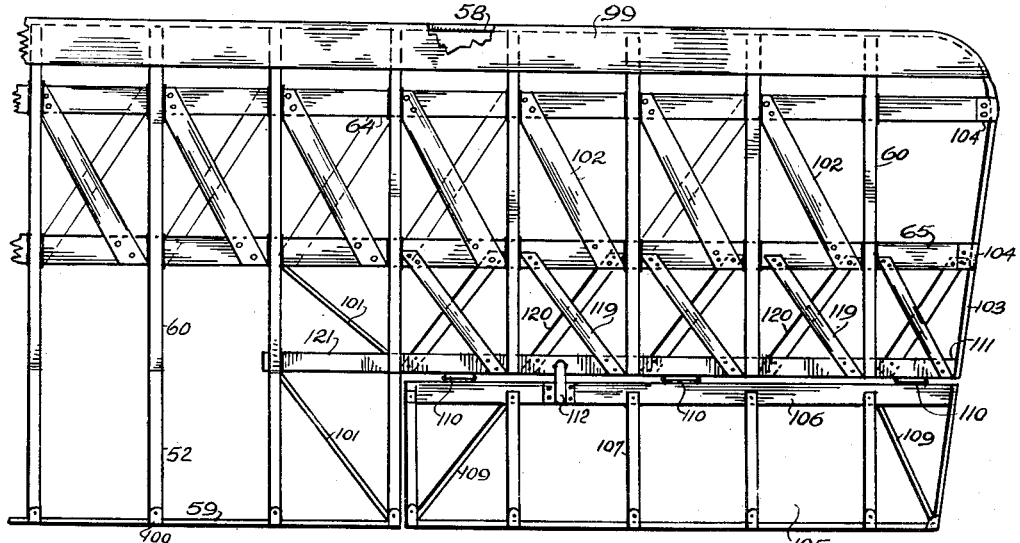
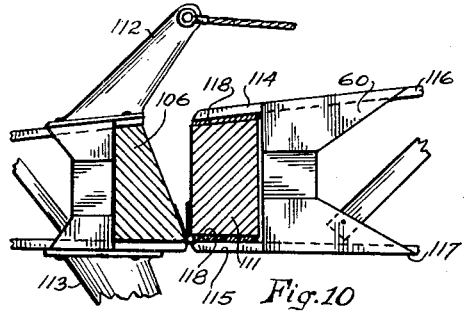
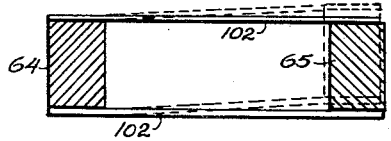
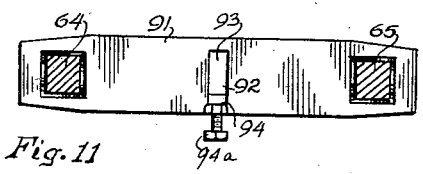
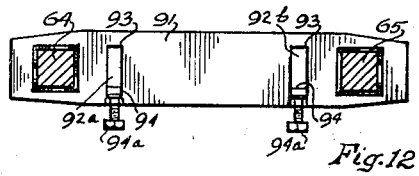
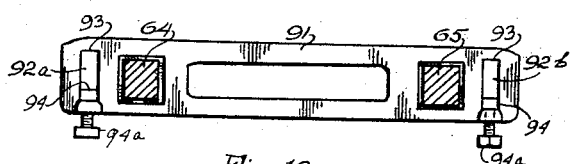
INVENTOR
John D. Van Vliet Dec. 5, 1939.  J. D. VAN VLIET  2,182,366
RESILIENT WING FOR AIRPLANES
Filed Oct. 8, 1937  6 Sheets-Sheet 4

INVENTOR
John D. Van Vliet

Dec. 5, 1939.  J. D. VAN VLIET  2,182,366
RESILIENT WING FOR AIRPLANES
Filed Oct. 8, 1937  6 Sheets-Sheet 5

INVENTOR
John D. Van Vliet

Dec. 5, 1939. J. D. VAN VLIET 2,182,366
RESILIENT WING FOR AIRPLANES
Filed Oct. 8, 1937 6 Sheets-Sheet 6

INVENTOR
John D. Van Vliet

Patented Dec. 5, 1939

2,182,366

UNITED STATES PATENT OFFICE 2,182,366

RESILIENT WING FOR AIRPLANES

John Dumans Van Vliet, Grand Haven, Mich.

Application October 8, 1937, Serial No. 167,881

23 Claims. (Cl. 244—38)

One of the objects of my invention is to provide a resilient wing in which the number of supports is automatically increased concurrent with an increase in the air load, these supports being so arranged that the stresses in the wing spars are thereby materially reduced.

Another object of the invention is to provide means for attaching and supporting the wing spars in such a fashion that axial loads are thereby eliminated.

Still another object is to provide means for attaching and supporting the wing spars in such a fashion as to render the wing structure as a whole capable of transverse and helicoidal deformation under an air load.

A further object is to provide a wing structure capable of lateral and helicoidal deformation without interference or binding of any of the component members of the wing structure with any other component members.

A still further object is to provide wing spars possessing a high degree of resilience with minimum weight and maximum resistance to bending stresses.

A still further object of the invention is to provide resilient mountings for the wing ribs with means for adjusting their degree of resilience.

Still another object of the invention is to provide a resilient wing structure possessing an inherent resilient wash-in at the tips and resiliently flexible trailing vanes at the posterior edge of the wing.

With these and cognate objects in view, my invention resides in the constructions and arrangements hereinafter described and more particularly pointed out in the appended claims.

Reference is to be had to the following drawings, in which:

Figure 3 is a sectional view in Figure 1 taken along the line III—III.

Figure 4 is a detail in Figure 1 illustrating the way in which the wing spar is supported.

Figure 5 shows a modification of the arrangement of the spars depicted in Figure 1.

Figure 6 shows another modification of the spar arrangement.

Figure 7 shows an arrangement fundamentally conforming to that shown in Figure 4 but differing therefrom in detail in that the secondary spar is braced externally.

Figure 7a shows a detail in Figure 7.

Figure 8 exemplifies the means for bracing the wing structure against drag forces in the plane of flight.

Figure 9 depicts diagrammatically how the drag bracing shown in Figure 8 permits unimpeded flexing of the spars to take place.

Figure 10 shows how the method of supporting the spars is applied to an aileron carrying spar.

Figures 1, 2:
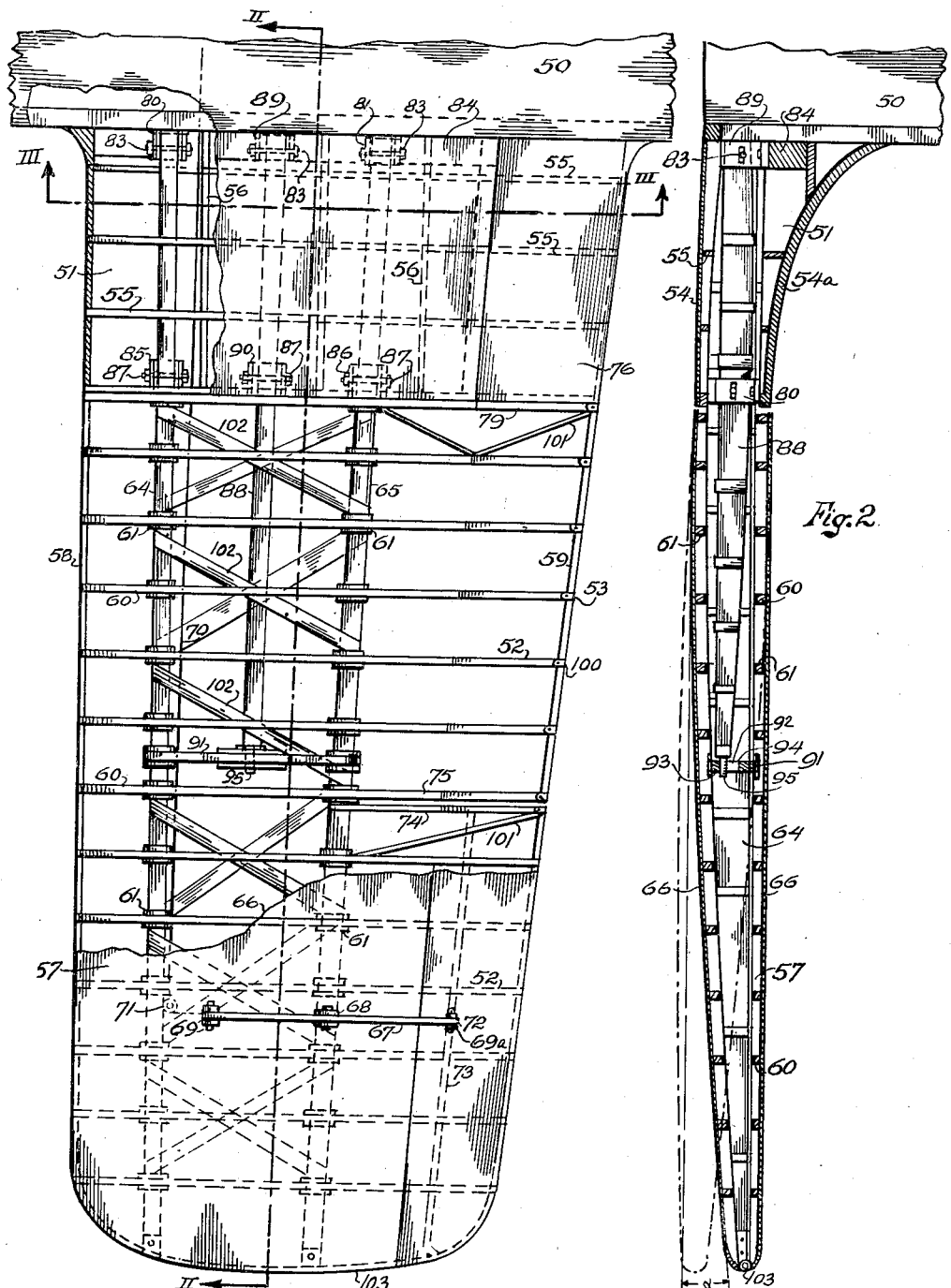
Figure 1 is a plan view of the wing, the wing covering being shown as partially removed to disclose the internal construction.
Figure 2 is a sectional view of the wing taken along the line II—II in Figure 1.

Figure 11 shows a secondary wing spar support adapted to the spar arrangement shown in Figure 1.

Figure 12 shows a secondary wing spar support adapted to the arrangement depicted in Figure 5.

Figure 13 shows a secondary wing-spar support adapted to the arrangement depicted in Figure 5.

Figure 14:
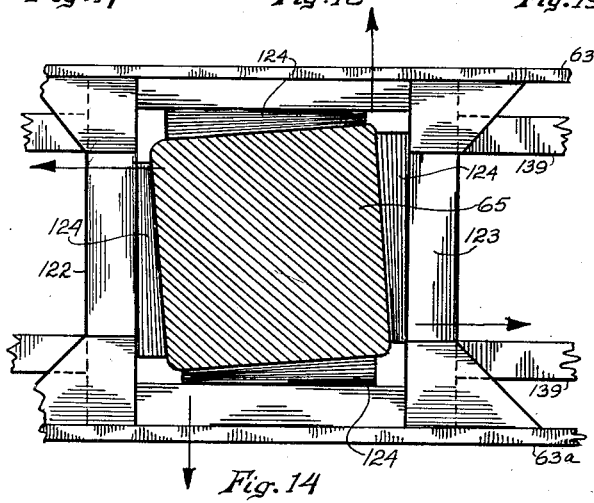

Figure 14 illustrates the function of a resilient wing rib support interposed between the rib structure and the spar.

Figure 15:
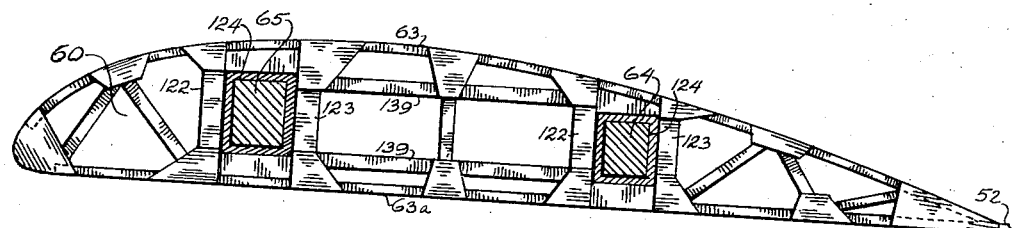

Figure 15 shows a wing rib construction reinforced by certain compression members.

Figure 16:
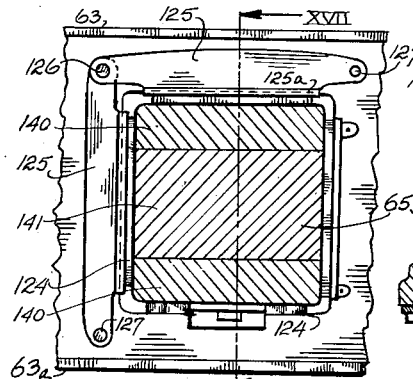

Figure 16 shows a device for regulating the initial compression of the resilient rib mountings.

Figure 17:
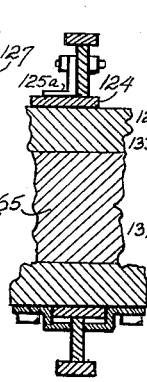

Figure 17 shows a cross-section taken along the line XVII—XVII in Figure 16.

Figure 18:
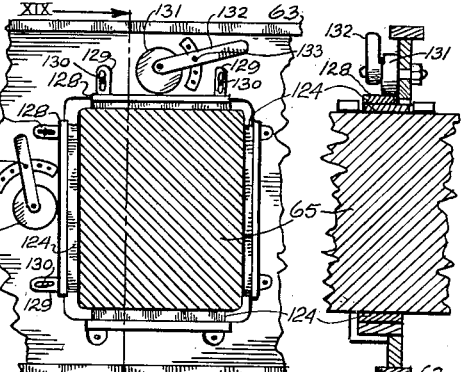

Figure 18 shows a modification of the device for adjusting the degree of resilience of the rib mountings.

Figure 19:
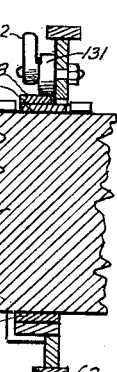

Figure 19 is a cross-section in Figure 18 taken along the line XIX—XIX.

Figure 20:
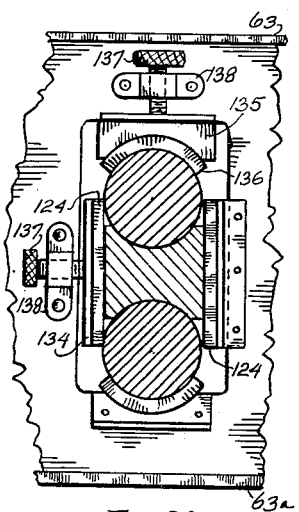

Figure 20 shows still another modification of the device for adjusting the resilience of the rib mountings.

Figure 21:
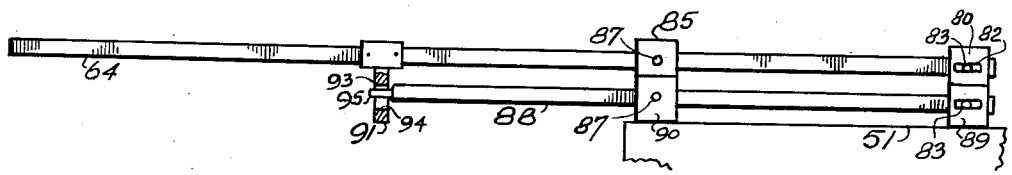

Figure 21 shows diagrammatically the relation between the primary and secondary spars.

Figure 22:
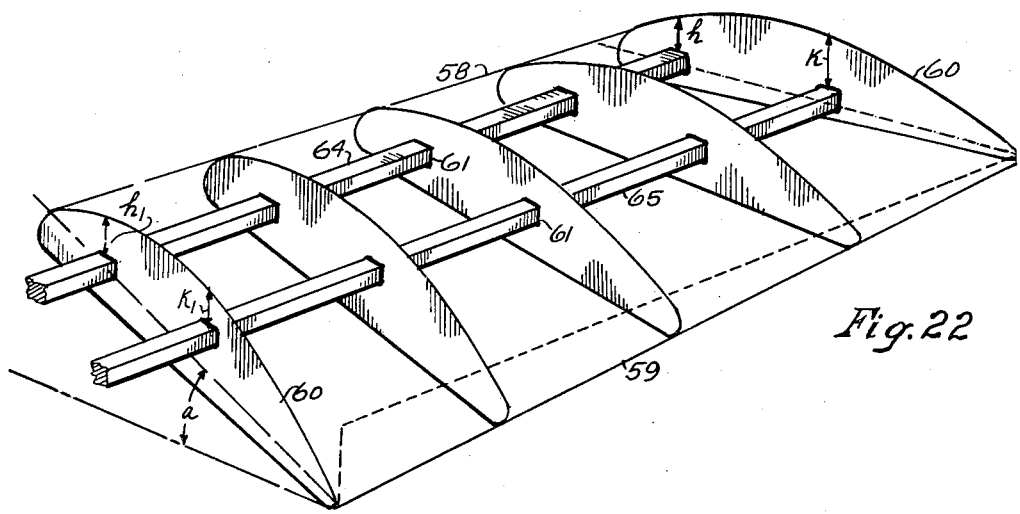

Figure 22 illustrates a method whereby an inherent wash-in is imparted to the wing.

Figure 23:
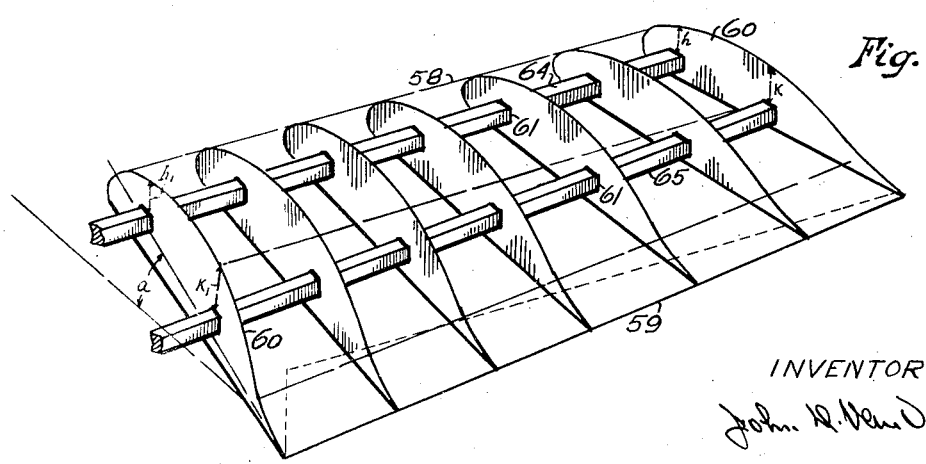

Figure 23 shows a method of construction differing in detail from that shown in Figure 22 but achieving the same object.

Figures 24 to 31 inclusive show sectional views of certain wing spar constructions of a composite nature.

Figure 32:
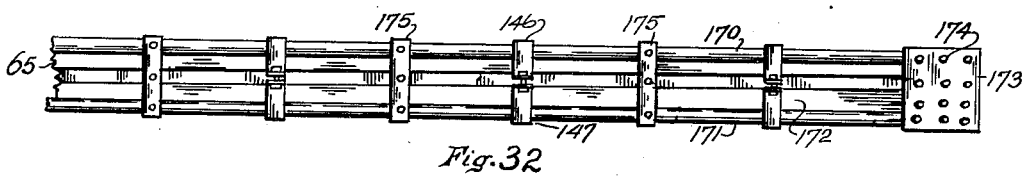
Figure 33:
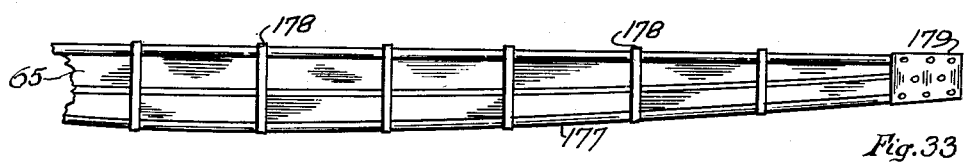
Figure 34:
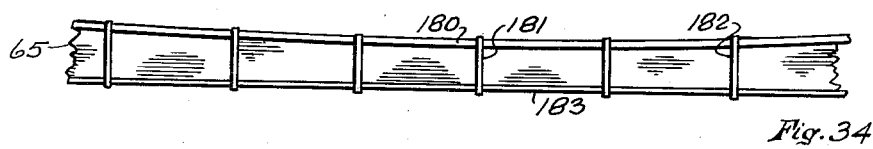

Figures 32 to 34 inclusive show such spar constructions in their lengthwise aspect.

Figure 35:
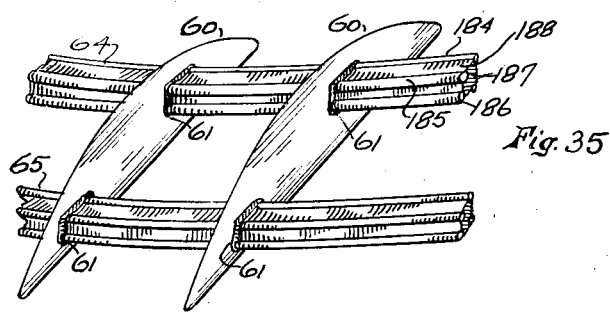

Figure 35 shows the composite wing spars in relation to the ribs.

Referring to Fig. 1 it is seen that the wing of my invention comprises two separate and distinct portions, namely: an inner portion of rigid construction integral with or rigidly attached to the main body or fuselage of the airplane, and an outer portion of resilient attributes carried by the inner portion in the manner hereinafter described. The body 50 of the airplane has the outboard structures 51 extending laterally from the sides thereof, the upper and lower surfaces 54 and 54a respectively conforming to the corresponding contours of an airfoil. The outboard structures 51 have the fore-and-aft bracing members 55 and the transverse bracing members 56 which correspond to the ribs and spars of a wing stub integral with the body of the airplane.

The outer- or extension-wing 57 forms a continuation of the stubwing and is internally provided with a plurality of transverse members such as the front spar 64 and the rear spar 65. Although only two such spars are shown in the drawings, I wish it to be understood that the number of spars may be of any plurality consistent with the chord length and the strength requirements of the wing.

The extension wing 57, hereinafter simply called wing, has the entering edge member 58 and the trailing-edge member 59, as well as such transverse stringers (not shown in the drawings) which may be called for to keep the framework of the wing in alignment.

The ribs 60 are mounted on the spars by the resilient mountings 61 which are designed to permit spontaneous universal adjustment of the ribs relative to the spars. In its simplest embodiment such a resilient mounting consists of strips of elastic material interposed between the spars and the surrounding web members, the ribs being thereby enabled to rock to some extent about the spars in any direction so that ribs and spars can unimpededly assume their required relative positions during the flexing of the wing.

The ribs have a forward or main portion of pronounced camber, comprising the upper capstrip 63, the lower capstrip 63a, and the webmembers enclosed thereby; the rear portion of the rib consists of the flat trailing member 52 integral with or rigidly attached to the main portion of the rib. This trailing member 52 is flexible and possesses a high degree of resilience. The trailing edge stringer 59 is fastened by adequate means such as the clips 53 to the extremities of the trailing members, while an entering edge member 58 connects the ribs in front. The wing covering 66 is secured to the ribs and the transverse members, the airfoil thus contrived having a deep well-cambered front portion and a flat vane-like rear portion adapted to flex and vibrate in accordance with the turbulence and fluctuations of the aircurrents.

Lateral control is achieved by warping the wing tips or by the use of ailerons. The warping device shown in Figure 1 has the lever 67 centrally pivoted in the bracket 68 which is secured to any conveniently located member of the wing frame. The front extremity 69 of the lever has connection with the control cable 70 running over the pulleys or leads 71 to the control post in the pilot's cockpit.

The rear extremity 69a of the lever engages the bracket 72 secured to the trailing vane of the wing, the resilient trailing members 52 being connected by the flexible resilient transverse member 73 whereby their concerted warping action is assured. Since in this type of wing sufficient lateral control can be obtained by merely flexing the trailing vanes at the tip of the wing, the laterally outer section of the trailing vane is separated from the inner section by the extention rib 74 adjacent to but not connected with the rib extension 75 of the inner section. The flexible trailing vane of the wing has its continuation in the trailing vane 76 which is detachably secured to the stubwing by such means as the bolts or screws 77 in the rear transverse member 78.

The main spars 64 and 65 of the wing extend beyond the inner lateral edge 79 thereof and are inserted into the interior of the stubwing. They rest in the inner terminal supports 80 and 81 respectively, the mode of their attachment being such as to permit a slight pivotal and sliding movement of the spars in the supports as afforded by the slots 82 which receive the bearing pins 83 secured to and extending laterally from the spars. I wish it to be understood that this device is merely an exemplification of means for allowing relative pivotal and sliding motion between the spars and their supports, for which any other device by which the same result is obtained may be substituted. The supports 80 and 81 are secured to any suitable rigid member in the stubwing or in the fuselage, such as the member 84. A second set of supports, 85 and 86 respectively, is provided for the wing spars, located at or near the lateral edge of the stubwing. Pivotal motion of the spars in the supports is afforded by the pins 87, but lengthwise displacement of the spars is excluded.

It is obvious that if each wing spar were supported only in the two supports as described, the maximum bending moments would occur at the supports 85 and 86. This two-point mode of supporting the spars would however impose no limit to the flexing of the spars and an increase in the wing load would produce a corresponding increase in the maximum bending moments at the supports 85 and 86. It is evident that if the spars were designed to withstand a maximum bending stress by the sectional dimensions giving the required section-modulus, the sectional moment of inertia would thereby be increased disproportionately, which would entail an equally disproportionate decrease in flexibility. The requirement of strength therefore would be satisfied at the expense of the desired flexibility.

In order to satisfy both requirements, the spars are each provided with a third support located intermediate the supports 85 and 86, and the tip of the wing. These outboard supports are so constructed as to permit the wing spars to flex freely from the intermediate supports 85 and 86 outward, responsive to a load equal to a fraction of the spar loads in normal flight. The outboard supports become effective only when this fractional load is exceeded, at which moment the mode of support changes from two-point to three-point. The stresses for these two conditions are designated as "primary" for the two-point support and as "secondary" for the three-point support, and the main spars of the wing are hereinafter referred to as "primary spars."

In Figure 1 the two primary spars 64 and 65 are connected by the bridgemember 91 which is resiliently mounted on these spars in the manner applied to the wing ribs.

The bridge member 91 is provided with a vertical slot 92 which has the upper sill 93 and the lower sill 94. Auxiliary spars 88, hereinafter referred to as "secondary spars," resting in the inner support 89 and the outer support 90, are inserted in the stubwing and extend outward therefrom into the interior of the extension wing, apertures for their passage having been provided in the webs of the wing ribs. The terminal member 95 of the secondary spars is received in the slot 92 of the bridgemember 91, in floating relation to the upper and lower sills 93 and 94. When the wing is not subjected to an airload the member 95 contacts the upper sill 93, thereby supporting the wing against dropping by its own weight.

When, on the other hand, the wing is subjected to a certain fraction of the normal airload, the spars will flex upward until the member 95 of the secondary spars contacts the lower sill 94. When this fractional load is exceeded the secondary or outboard support becomes effective and from that moment on the statical conditions prevailing in the wing spars correspond to those of a continuous girder supported freely at three points. The maximum bending moment in this case then will occur at the outboard or secondary support and from there toward the fuselage the bending moments, and consequently the stresses, will diminish greatly, in contrast to the bending moments which would occur if no secondary support were provided. Graphical stress analysis shows that the portions of the spars from the outboard supports inward automatically acquire an increased factor of safety due to the interference of the moments caused by the loads on the overhanging portions of the spars when the total wing load is increased, as would be the case during a sharp turn or when pulling out of a dive.

The structural safety of the wing is thus at all times assured. Several variations of the above described construction are possible, in all of which the mode of supporting the spars changes from a two-point support for a fraction of the normal load to a three-point support for a load exceeding this fraction. In Figure 5 two auxiliary spars 88a and 88b have been substituted for the single spar 88 shown in Figure 7, these two auxiliary spars being arranged along the inner sides of the main spars. The bridge member 91 as shown in Figure 12 is correspondingly modified by having the two slots 92a and 92b which receive the terminal members 95a and 95b, respectively, floating between the upper and lower sills 93 and 94 of each slot. This arrangement is preferable when the main spars are spaced far enough apart to allow elastic oscillations of the wing to take place about the terminal member of a single auxiliary spar; it is obvious that such oscillations are undesirable and that they are eliminated by providing two points of support for the bridge member.

Another variation is shown in Figure 6. The two auxiliary spars 88a and 88b are placed on the outside of the mainspars, an arrangement which serves essentially the same purpose as that shown in Figure 5. The corresponding modification of the bridge member is shown in Figure 13.

Still another modification is shown in Figure 7. The auxiliary spar 88 is braced externally by the member 189 which has slidable and pivotal connection 190 with the auxiliary spar and pivotal connection 191 with the fuselage 50. The advantage of the arrangements shown in Figures 2, 5, and 6 resides in the fact that the freely supported auxiliary spar is thereby not subjected to an axial load at any time so that the stresses occurring in the spar are only those caused by bending loads.

In wings of considerable span however, the corresponding extension of the auxiliary spar may lead to excessive weight if its strength is to be maintained; for that reason it may be found expedient to use the externally braced construction above described whereby a reduction in weight can be obtained, although the auxiliary spar in that case will then have an axial load imposed upon it and will consequently be subjected to buckling stresses.

In accordance with the general trend of design, the auxiliary spar possesses a certain amount of resilience and flexibility whereby shock-contact with the secondary support is obviated; the pivotal connection 190 of the bracing member 189 is therefore allowed to slide in the substantially horizontal slot 190a whereby the spar 88 is enabled to flex in accordance with a predetermined load reaction at the terminal member. When this reaction exceeds the predetermined value, the pivotal connection 190 will contact the limiting sill 192 and from that moment on the auxiliary spar 88 will act as a member of a triangular truss and will be subjected to the buckling stresses induced by the excess load reaction. The ratio of the excess load to the desired pre-determined load can be regulated by adjusting the position of the sill 192 by such means as the screw 193.

In a like manner, the ratio of the primary load, which causes the main spars to flex in accordance with a two-point mode of support, to the full load at which the spars flex in accordance with a three point mode of support, can be regulated by the movable lower sill 94 which can be raised or lowered by such means as the screw 94a whereby bearing contact with the terminal member 95 is advanced or retarded.

Such adjustments are advantageous in cases where the gross weight of the plane varies considerably due to fuel consumption or the releasing of bombs, mail or cargo, which changes the ratio of primary load to full load and thus causes a considerable modification in the statical conditions of the wing spars.

I wish it to be understood that such adjustments can be made by the pilot during flight by simple cable or rod connections leading to the cockpit, although no such means have been shown in the drawings.

In order to check the landing speed the wings are mounted at an inherent ca-hedral angle. During flight the wings will flex up laterally and may even assume a slight dihedral angle as shown by the dotted lines in Figure 2 in which the angular displacement of the wing is indicated by the angle "a". It is evident that when the wing is in this position a certain amount of air is shed.

While effecting a landing however with the wings at an angle of incidence approaching the stalling angle, the airload will gradually decrease and the wings will accordingly tend to return to their inherent ca-hedral position whereby the airshedding action will be to a great extent prevented. As shown in Figure 2 the inherent ca-hedral setting of the wings is obtained by placing the stubwings at a similar angle so that the lateral conformation of the wings and stubwings remains smoothly continuous. This arrangement can of course be varied by giving the extension wings alone a cahedral angle, which can be contrived by placing the innermost spar supports at a higher level than the supports at the edge of the stubwing, whereby a laterally downward slant is imparted to the wings spars.

When set at a cahedral angle, the wings will evince a tendency to twist upward at the tips if the rear spar possesses a greater degree of flexibility than the frontspar or if the center of pressure moves far to the rear of the elastic axis of the wing. The wings thereby acquire a washout while in flight, which may persist even in landing. In order to counteract this tendency to wash out at low speed, the wings are inherently provided with a downward droop at the trailing edge so that the wings under no load possess a helicoidal conformation the reverse of that prevailing in flight. In Figure 22 both spars are shown parallel to one another. The distance $h$ from the top of the front spar to the capstrip of the rib at the root of the wing is the same as the corresponding distance $h_1$ at the tip. At the rear spar however the distance $k$ at the root is considerably greater than the corresponding distance $k_1$ at the tip, the ribs having been gradually dropped at the rear spar so that the chord of the outermost ribs makes positive angles with the chord at the root. The trailing edge has been dropped accordingly and deviates downwardly from the dotted line which is parallel to the spars and the entering edge.

Figure 23 shows the same effect obtained by an alternative method. The rear spar is placed at a downward angle so that front and rear spars are askew to one another, while the position of all the ribs relative to the spars remains the same from the root to the tip of the wing. This imparts to the wing structure an inherent downward twist to the extent of the angle $a$. This mode of construction can be used in combination with the first method, if so desired, but preference is given to using it by itself.

In a wing of the non-rigid or flexible type the wingspar will bend in accordance with the lateral and helicoidal deformation of the wing during flight and it is self-evident that such spontaneous twisting of the wing demands a certain amount of movement of each spar independent of the other. This condition is illustrated in Figure 9 in which the relative position of the spars during flexing is indicated in dotted lines.

It is evident that by reason of the flexing of the spars and their attendant bodily movement with respect to each other, a drag-bracing of the strut-and-crosswire type or of the rigid-truss type would greatly interfere with the spontaneous helicoidal and lateral deformation of the wing, and that a method of drag-bracing is required which allows the spars to flex independently while at the same time insuring the rigidity of the structure in a horizontal sense. The method of drag-bracing evolved to satisfy these conditions is illustrated in Fig. 1 and Fig. 8.

It is seen that the wing structure comprises the flexible spars 64 and 65, the ribs 60, the nose stringer 58, and the trailing edge member 59. The entering edge of the wing is formed by the resiliently pliable nose covering 99. The nose stringer is not rigidly connected to the nose covering and is moreover slidably carried in the nose rings or clips secured to the ribs. If the material used for the nose covering has sufficient stiffness to retain its camber under wind pressure, the stringer 58 can be omitted. The trailing edge stringer 59 is fastened to the rear tips of the ribs by such means as the clips 100 which are adapted to allow a certain amount of sliding displacement of the stringer. The corners of the wing frame are reinforced by the resiliently pliable braces 101.

The spars are braced against deflection in a horizontal plane by the pliable strips 102 which are preferably positioned diagonally to the spars. If these strips are of considerable length they may be reinforced against buckling by lengthwise placed battens or by upturned edges. Figure 9 illustrates how these bracing strips adapt themselves to the mutual displacement of the spars. Since the relative movement of the spars is slight, the bracing strips 102 serve as spacers as well as webs of a box girder of greater width than depth. The lateral tip of the wing is formed by the resiliently flexible member 103 which is slidably carried in the clips 104.

As has already been pointed out, lateral control can be effected either by wing warping as shown in Figure 1 or by ailerons as shown in Figure 8. The aileron 105 has the front spar 106 and the ribs 107 similar to the flat trailing members of the wing ribs. The aileron front spar is pivoted by the hinges 110 to the wing member 111 and is provided with the aileron horns 112 and 113 operated by such means as control wires or rods. In order to prevent any binding of the auxiliary spar 111 in the ribs 60 of the main wing structures, the spar 111 is floatingly carried between the rear extremities 114 and 115 of the upper and lower capstrips 116 and 117 respectively, clearance spaces being provided between the spar and the capstrips into each of which is inserted a resilient strip 118. In a wing of considerable thickness this arrangement may be modified by employing a bracket of equivalent shape secured to the rear end of the rib.

The wing aileron spar 111 is connected to the main spar by the top strips 119 and the bottom strips 120 arranged cross-wise thereto, these strips being of resiliently flexible material like that of the drag bracing strips of the main spars. The spar 111 is preferably extended beyond the inner edge of the aileron, this extension 121 being floatingly carried by the ribs in resilient bearings similar to those employed for the ribs on the main spars. It is readily seen that the above described arrangement eliminates any interference of the aileron-structure with the flexing actions of the main wing-structure.

As shown in Figure 14, the resilient strips 124 are interposed between the spar and web members 122 and 123, these strips preventing the spars from being torsionally stressed during the twisting of the wing with attendant straining of the web members. The strips 124 are shown as applied individually to the four sides of the spars; it is obvious that this arrangement can be varied by using a continuous strip of resilient material wrapped around the spar which will answer the same purpose. The spar is shown as having rotated from its original position parallel to the web members 122 and 123 so that each strip is compressed at one end and expanded at the other end. When the compressive limit has been reached the spars will then be subjected to torsion, the torsional couple being indicated by the arrows. When the strips fit too loosely the ribs will have a certain amount of play which allows the airfoil to twist without utilizing the full resilience of the spars. On the other hand, if the strips fit too tightly, the twisting of the wing will immediately cause torsional stresses in the spars with attendant torsional vibrations which are detrimental to their structural integrity. Means are therefore provided whereby a satisfactory initial compression is imparted to the strips, such as the levers 125 pivoted on the pins 126 and locked in place by the pins 127, these levers having the edges 125a bearing on and compressing the resilient strips. An elaboration of this device is shown in Figure 18 in which the strips are held down by the angle plates 128 which are mounted in slidable relation to the web by such means as the slots 129 and the pins 130. Pressure is applied by the cams 131 adjustable by the levers 132 which are locked by the pins 133. A modification of the device is shown in Figure 20 in which the plates 134 and 135 are pressed onto the resilient strips 136 by means of the screws 137 threaded in the lugs 138. All the above described devices can be applied to spars of any sectional shape by forming the bearing plates accordingly, and in the two last described devices any desired initial compression of the resilient strips can be obtained.

The rocking of the wing ribs about the spars incidental to the twisting of the wing imposes certain compressive stresses on the rib webs which are accordingly reinforced by the compression members 139 interposed between the web members 122 and 123, as shown in Figure 15.

Figures 24, 25, 26, 27, 28:
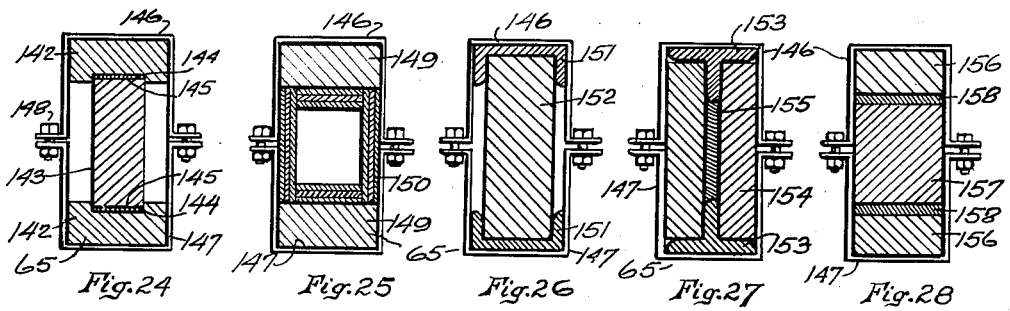

The combination of resistance to bending stresses with flexibility in a spar of homogeneous material may lead to excessive weight, so that the cross-sectional conformation of the spar must needs be a compromise in which any one of the requirements of weight, strength, flexibility, and resilience can only be completely satisfied at the expense of the others. In order to reasonably satisfy all requirements a construction is resorted to in which the spars consist of a plurality of component members, the outer members of which are of a material possessing great resistance to fracture and a relatively high modulus of elasticity, while the inner component members are of a material having a relatively lower modulus of rupture and a relatively lower modulus of elasticity. Thus, Figure 24 shows a cross-section of a spar generically indicated by the numeral 65, which has the outer members 142 and the inner member 143, all said members being securely united and held against relative displacement by the straps 146 and 147 clamped about the spar by the bolts 148. The function of the inner member 143 is largely that of a spacer for the outer members so that the composite spar section has the full benefit of the moment of inertia of the combined outer members. It is obvious that by spacing outer members of a high degree of resistance to bending stresses by an inner member of considerably less weight, a great saving in the total weight can be effected and that the flexibility of such a spar is far greater than if it were made of a single member of homogeneous material.

Various refinements of construction can be introduced, such as the mortised jointing 144 with the resilient strips 145 interposed, the degree of elasticity of the resilient interposed strips determining the degree of flexibility of the composite spar. The less firmly the component spar members are connected, the more they will tend to act as separate spars, with an attendant lessening of the modulus of resistance and moment of inertia of the composite cross-section. If the central member is intended to act merely as a spacer with unrestrained displacement relative to the outer members, the composite spar will virtually consist of a plurality of separate members and its resistance to bending will thereby be greatly diminished.

A number of variations in the fundamental arrangement can be introduced, a few of which are shown in the drawings. Thus in Figure 25 the inner member has been represented by a box-girder 150, while in Figure 28 the inner member 157 has the full width of the outer members 156, the intermediate members 158 being moreover interposed between the outer and inner members. In Figure 26 the outer members 151 are of channel section and cap the inner member 152. In Figure 27 the outer members 153 are of T-section, the inner members 154 being placed between the flanges of the outer members, with a vertical filler member 155 interposed between the inner members.

Figures 29, 30, 31:
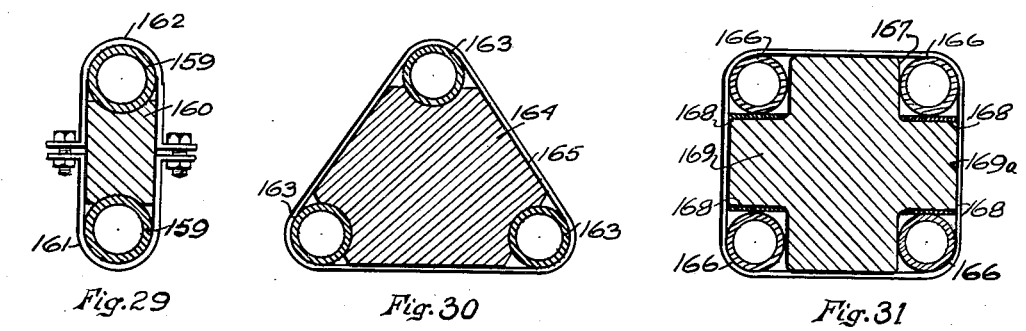

Figure 29 shows a composite spar the outer members of which consist of tubing 159, these tubular outer members being held in spaced relation by the inner member 160. The number of tubular members may be of any plurality and of different diameters and wall thicknesses in accordance with the design requirements.

Figure 30 shows how three tubular outer members 163 are arranged at the corners of the triangularly shaped inner member 164.

Figure 31 shows four tubular outer members 166 grouped about the substantially quadrangular inner member 169 which has the corner recesses 167 conformed to receive the outer members, so that the smooth cross-sectional contour of the composite spar is preserved. The bearing strips 168 prevent the softer inner member from being indented by the outer tubings.

In all the above described constructions the component spars are firmly clamped together by the straps 146 and 147 as in Figures 24, 25, 26, 27 and 28; the rounded straps 161 and 162 as in Figure 29; the triangular strap 165 as in Figure 30, and the strap 169a as in Figure 31. The spar shown in Figure 20 is similar to that shown in Figure 29, the outer members however being of solid cross-section instead of tubular.

Referring to Figure 32 it is seen that the spar generically indicated by the numeral 65 has the outer members 170 and 171 held in spaced relation to each other by the inner member 172. The outer members are connected at their extremities by the member 173, being rigidly secured thereunto by such means as welding or brazing, or by rivets or bolts 174 which prevent relative longitudinal displacement between the outer members. These outer members are further connected by the intermediate members 175, as well as by the clamp-sets 146 and 147. Either one of these means can be employed singly, as well as both in combination.

The spar shown in Figure 32 is of uniform section throughout. This construction however is subject to modification if the spar is to conform to lateral tapering of the wing. Figure 33 shows a spar tapering at the tip, the taper having been contrived by bending the lower component member 177 upward and forcibly retaining it in place by the connecting straps 178 and 179. This arrangement causes a slight downward bending of the upper member and consequently of the entire wing spar whereby a constant resilient contact of the wing with the air is assured. In some cases it may be found expedient to make the spar more flexible in a region intermediate the root and the tip of the wing.

In order to effect the required decrease in the moments of inertia in that region, the outer member 180, as shown in Figure 34, is bent inward and held in position by the straps 181 and 182. An initial bending stress will then be imposed upon the lower member 183, causing this member to bend inward. When the spar flexes upward during flight the attendant compression in the upper member will counteract the initial tensile stresses whereby the safety factor of this upper member is enhanced. By judicious valuation of the initial design stresses the spar can thus be built in such a way that only fluctuations of stresses of the same sign can prevail without the destructive alternation from positive to negative values. Figure 35 shows the component spars in relation to the wingribs. The spars 64 and 65 have the outer members 184, 185, 186 and 187 of high tensile strength and resilience grouped about the inner member 188 which possesses these qualities in a considerably less degree. The ribs are mounted on the spars by means of the flexible mountings 61, the general scheme of assembly thus conforming to that hereinbefore described.

The materials of which the outer and inner members are composed are selected as to their physical properties with a view to damping the vibration of the entire composite spars, so that the resultant natural frequency of the spar is less than the inherent natural frequency of its outer members. It is important that the vibrations of the wingspars be tuned out as soon as possible in order to eliminate resonant vibrations in the wingstructure. For this reason the inner members of the spar are made of a material possessing a large hysteresis loop, in contrast to the relatively smaller hysteresis loop of the material of the outer members. The choice of materials therefore is determined by their divergent abilities to damp the vibrations imparted to the spars in bending and by aerodynamic impulses.

The wing above described is capable of flexing laterally by virtue of the resiliently flexible wing spars, the intermittently active outboard supports completely modifying the bending stresses after a certain fraction of the normal load has been exceeded. The spars remain always freely supported so that stresses other than those due to pure bending loads are entirely excluded.

The same conditions prevail in the auxiliary or secondary spars when supported at two points, and partially so when supported in addition by external bracing members, in which latter case they will be subjected to bending as well as to buckling.

The wing is capable of spontaneous helicoidal deformation by virtue of the flexible drag bracing which permits the spars to flex independently, as well as by reason of the resilient rib-mounting which allows the ribs to rock in any direction and thus to cooperate with the flexing of the spars. The flexibly resilient nose covering cooperates with the ribs, as does also the wing tip member which has floating mounting in the spar tips. The aileron carrying spar, which is likewise floatingly mounted and braced, does not interfere with the rocking of the ribs while the resiliently flexible trailing edge stringer allows the resilient trailing extensions of the ribs to function without undue interference.

The wing thus comprises a frame work in which any of the component structural members are movable with respect to any of the other component members. Actual flight tests and wind-tunnel tests have shown that a wing of this type imparts great lateral stability to the plane, greatly increased climbing ability, a considerable increase in speed, and a quicker take-off.

Having thus described my invention, I claim:

1. An airplane having a rigid body, wing stubs of rigid construction integral with the said body and extending laterally from the opposite sides thereof; wings inherently adapted to elastic deformation continuous with the said wing stubs, each wing having a plurality of spars extending the entire length of the wing and prolonged outward of the wing structure beyond the root of the wing into the interior of the wing stub; means in said wing stubs supporting the spars at their extremities; means in said wing stub supporting the spars at points near the lateral edge of the wing stub; a bridge member connecting said spars transversely intermediate the tip and the root of the wing; and auxiliary spars having support and attachment in said wing stub freely contained in said wing, the extremities of the said auxiliary spars affording support to the said bridge member but having otherwise no fixed connection therewith.

2. An airplane having a rigid body including wing stubs of rigid construction integral therewith and extending laterally from the opposite sides thereof, wings inherently capable of spontaneous elastic deformation continuous with the said wing stubs, each wing having a plurality of flexible and resilient spars extending the entire length of the wing and prolonged outward of the wing structure beyond the root of the wing into the interior of the wing stub, means in said wing stub for supporting and attaching the spars at their extremities, means in said wing stub supporting and attaching the spars at points near the lateral edge of the wing stub, a bridge member transversely connecting said spars intermediate the tip and the root of the wing, the said bridge member including vertically spaced sill members, means for adjusting the position of the lower sill members, and auxiliary spars having support and attachment in the said stub-wing, said auxiliary spars being freely contained within the said wing and being each provided with a terminal member positioned between the respective sill members, the vertical spacing of the said sill members being so adjusted that the lower sills will bear on the terminal members of the auxiliary spars when the wing spars are flexed upward in accordance with a predetermined fraction of the full load imposed on the spars during normal flight.

3. An airplane having a rigid body including wing stubs integral therewith and extending laterally from the opposite sides thereof, and detachable extension wings continuous with and carried by the said wing stubs, said extension wings having a well-cambered front portion merging with a flat vane-like rear portion of resiliently flexible attributes adapted to airshedding action and to spontaneous vibration in accordance with the fluctuations of the air currents, the said wing stubs having a similarly cambered main portion of rigid construction and a flat vane-like rear portion of resiliently flexible attributes secured thereunto.

4. An airplane wing adapted to spontaneous elastic deformation laterally and helicoidally about its elastic axis having inherently flexible and resilient spars arranged substantially parallel to each other when the wing is not subjected to an airload, and askew to each other during the helicoidal twisting of the wing, and a resiliently flexible drag-bracing connecting said spars, the said drag-bracing trussing the spars against flexure due to the drag forces on the wing while allowing them to flex independently of each other in accordance with the helicoidal deformation of the wing due to lift forces.

5. An airplane wing adapted to spontaneous elastic deformation laterally and helicoidally about its elastic axis, including inherently flexible and resilient spars arranged substantially parallel to each other when the wing is not subjected to an airload, and askew to each other during the twisting of the wing as occasioned by an airload, and strips of resiliently flexible material connecting the said spars, said strips being arranged diagonally to the spars along the top and bottom sides thereof in laterally spaced relation to each other.

6. An airplane wing adapted to spontaneous elastic deformation laterally and helicoidally about its elastic axis having a main internal girder of greater width than depth, the said girder being inherently capable of elastic deformation laterally and helicoidally about its axis but possessing great resistance to bending in a substantially horizontal plane, said girder comprising a plurality of resiliently flexible members extending the length of the wing, and truss-members connecting said first-named members, diagonally on the top side thereof and anti-diagonally on the bottom side thereof, the said truss-members being of resiliently flexible material shaped to allow flexing in a vertical sense but offering great resistance to bending in a horizontal sense and to buckling in the direction of their length axis.

7. An airplane wing adapted to spontaneous elastic deformation laterally and helicoidally about its elastic axis having resiliently flexible main spars, ribs disposed transversely to said main spars and resiliently mounted thereon, said ribs cooperating with the said main spars during the helicoidal flexing of the wing, a series of said ribs being curtailed to afford inset for an aileron, the rear extremities of said ribs being bracketed to floatingly receive an aileron carrying spar, the said aileron carrying spar having resilient bearing in the bracketed extremities of the ribs, resiliently flexible members connecting said aileron carrying spar to the rear main spar of the wing, said resiliently flexible members being arranged diagonally along the top surface of the said spars and anti-diagonally along their lower surface, the said resiliently flexible members holding the aileron carrying spar against displacement away from the ribs and against lengthwise displacement relative to the mainspars, and an aileron having hinged attachment to said aileron carrying spar.

8. An airplane including a fuselage having wings inherently capable of elastic deformation laterally and helicoidally about their respective elastic axes, each of said wings comprising: resiliently flexible main spars; a resiliently flexible drag-bracing connecting said spars, said drag-bracing being conformed to permit each spar to flex independently of the other spar; wing-ribs disposed transversely to said spars, each wing-rib having a resilient universal-jointed mounting on each of said spars, said mountings being conformed to permit the ribs to rock about the spars in any plane; a resiliently flexible nose-covering constituting the entering edge of the wing, a resiliently flexible trailing-edge member floatingly mounted in the rear extremities of the wing-ribs; an aileron-carrying spar floatingly carried by said wing-ribs; resiliently flexible drag-braces attaching said aileron-carrying spars to the rear wing-spar; an aileron having hinged attachment to said aileron-carrying spar; a wing-covering adapted to elastic deformation having attachment to the said wing-ribs, nose-covering, and trailing-edge stringer, and co-operative with all of said elements; and secondary supporting means carried by the fuselage intermittently co-active with the said resiliently flexible main-spars for reversing and decreasing the bending-moments in the said wing-spars.

9. In an airplane the combination with the rigid body thereof, of wings extending from the opposite sides of the said body, the said wings being of inherent helicoidal deformation and capable of resilient deformation laterally and helicoidally about their structural elastic axes; each wing including a front-spar extending the entire length of the wing and projecting beyond the inner lateral edge thereof, the said front-spar being of such construction and resilient material as to enable it to flex elastically under a load; a plurality of supports carried within said rigid body arranged in transversely spaced relation to each other, the said supports having pivotal and slidable connections with the projecting portion of the said front-spar, the said supports being positioned to hold the said front-spar extended at any pre-determined angle to the body; a rear-spar extending the entire length of the wing and projecting beyond the inner lateral edge thereof, the said rear-spar being of such construction and resilient material as to enable it to flex elastically under a load to a relatively greater extent than the front-spar; a plurality of supports carried within the said rigid body arranged in transversely spaced relation to each other, the said supports having pivotal and slidable connections with the projecting portion of the said rear-spar, the said supports being positioned in laterally descending relation to each other with reference to the front-spar supports so that the rear-spar is thereby held extended from the body at a laterally downward angle to the front-spar, the said front- and rear-spars when under no load being thus positioned askew to each other; a plurality of cambered ribs carried by the said spars, each rib having web-members spaced to encompass the spars, all said ribs being positioned in substantially the same vertical relations to the front- and rear-spar respectively, the said ribs being thereby set at angles of incidence increasing progressively from the root to the tip of the wing structure whereby an inherent downward twist is imparted to the wing, the said downward twist being washed out in flight by the upward flexing of the rear-spar relative to the front spar, the ribs being thereby rotated to some extent about each spar in a fore-and-aft direction as well as in a transverse direction; and elastically deformable bearing members interposed between the spars and the spaced webmembers of the ribs for furthering the frictionally unimpeded and resilient rotation of the ribs about the spars.

10. In an airplane the combination with the rigid body thereof, the said body including wing-stubs of rigid construction integral therewith, of wings extending laterally from the said wing-stubs and continuous therewith, the said wings being of inherent helicoidal conformation and capable of elastic deformation laterally and helicoidally about their elastic axes; each wing including a front-spar extending the entire lateral length of the wing and projecting beyond the inner lateral edge thereof, the said front-spar being of such construction and resilient material as to enable it to flex elastically under load;

a plurality of supports carried interiorly by the wingstub arranged in transversely spaced relation to each other, the said supports having pivotal and slidable connections with the projecting portion of the said front-spar and being positioned to hold the said front-spar at a pre-determined angle to the wingstub; a rear-spar extending the entire lateral length of the wing and projecting beyond the inner lateral edge thereof, the said rear-spar being of such construction and resilient material as to enable it to flex elastically under a load to a relatively greater extent than the front-spar; a plurality of supports carried interiorly by the wingstub, the said supports having pivotal and slidable connections with the projecting portion of the said rear-spar and being positioned in such vertical relation to each other as to hold the said rear-spar extended at a laterally downward angle to the front-spar, the said front- and rear-spars being thus positioned askew to each other under no load; a plurality of cambered ribs carried by the said spars, each rib having webmembers spaced to encompass the spars, all said ribs being positioned in substantially the same vertical relations to the front- and rear-spar respectively so that the ribs under no-load conditions are set at angles of incidence increasing progressively from the root to the tip of the wing whereby an inherent posteriorly downward twist is imparted to the wing structure, the said downward twist being washed out in flight by the upward flexing of the rear-spar relative to the front-spar, the ribs being thereby rotated to some extent about each spar in a fore-and-aft as well as in a transverse direction; and resiliently deformable bearing members interposed between the spars and the spaced webmembers of the ribs for furthering the frictionally unimpeded and resilient rotation of the ribs about the spars during the spontaneous lateral and helicoidal deformation of the wing.

11. In an airplane, the combination with the rigid body thereof, the said body including wingstubs of rigid construction integral therewith, of wings extending laterally from the said wingstubs and continuous therewith, the said wings being capable of elastic deformation laterally and helicoidally about their respective elastic axes; each wing including a plurality of spars, arranged in fore-and-aft sequence, extending the entire lateral length of the wing and projecting beyond the inner lateral edge thereof, the said spars being of such construction and resilient material as to enable them to flex elastically under their respective loads, the rear-spars flexing to a relatively greater extent than the front-spar, so that all said spars during flight assume a position askew to each other; a plurality of supports for each spar carried interiorly by the wingstub arranged in transversely spaced relation to each other, the said supports having pivotal and slidable connections with the projecting portions of the spars, the said supports being positioned to hold the spars extended at any pre-determined angle to the wingstub; a plurality of cambered ribs carried by the said spars, each rib including webmembers spaced to encompass each spar, all said ribs being positioned in substantially the same vertical relations to the respective spars so that under no-load conditions the ribs present substantially the same angle of incidence from the root to the tip of the wing, whilst under load conditions they present angles of incidence decreasing progressively from the root to the tip of the wing as occasioned by the upward flexing of the rear-spars with reference to the front-spar, the ribs being thereby rotated to some extent about the spars in a fore-and-aft direction as well as in a transverse direction; and resiliently deformable bearing members interposed between the spars and the spaced webmembers of the ribs for furthering the frictionally unimpeded and resilient rotation of the ribs about the spars during the lateral and helicoidal deformation of the wing.

12. In an airplane, the combination with the rigid body thereof, the said body including wingstubs of rigid construction integral therewith and extending laterally from the opposite sides thereof, of wings extending laterally from the said wingstubs and continuous therewith, the said wings being of inherent helicoidal conformation and capable of elastic deformation laterally and helicoidally about their respective elastic axes; each wing including a front-spar extending the entire lateral length of the wing and projecting beyond the inner lateral edge thereof, the said frontspar being of such construction and resilient material as to enable it to flex elastically under its respective load; a plurality of supports carried interiorly by the said wingstub arranged in transversely spaced relation to each other, the said supports having pivotal and slidable connections with the projecting portions of the said front-spar, the said supports being positioned with reference to each other to hold the said front-spar at a cahedral angle to the wingstub; a rear-spar extending the entire lateral length of the wing, the said rear-spar being of such construction and resilient material as to enable it to flex elastically under its respective load to a relatively greater extent than the front spar; a plurality of supports carried interiorly by the wingstub arranged in transversely spaced relation to each other, the said supports having pivotal and slidable connections with the projecting portion of the said rear-spar, the said supports being positioned to hold the rear-spar extended from the wingstub at a laterally downward angle to the front-spar, the said front- and rear-spars being thereby positioned askew to each other; a plurality of cambered ribs carried by the spars, each rib including webmembers spaced to encompass the spars, all said ribs being positioned in substantially the same vertical relation to the front- and rear-spars respectively, so that the ribs under no-load conditions present angles of incidence increasing progressively from the root to the tip of the wing, thereby imparting an inherent posteriorly downward twist to the wing structure, the said downward twist being washed out during flight by the upward flexing of the rear-spar relative to the front-spar, the ribs being thereby rotated to some extend about the spar in a fore-and-aft direction as well as in a transverse direction; and resiliently deformable bearing members associated with the spars and the spaced webmembers of the ribs for furthering the frictionally unimpeded and resilient rotation of the ribs about the spars during the spontaneous lateral and helicoidal deformation of the wing in flight.

13. In a non-rigid wing for an airplane, in combination: a girder, a rib mounted on said girder in transverse relation thereto, the said rib including web-portions positioned in spaced relation to each other and combined to spacedly encompass said girder, bearing members movably mounted in said web-portions, members of pliant elastic material interposed between the sides of the girder and the said bearing-members, and adjustable means for locking the said movably mounted members onto the said elastic members in any desired compressing relation, whereby the rib is enabled to resiliently rock about the girder in any direction and to any desired degree.

14. In a non-rigid wing for an airplane, in combination: a girder, a rib mounted in said girder in transverse relation thereto, the said rib including web-portions positioned in spaced relation to each other and combined to spacedly encompass said girder, lever-members having pivoted mounting in said web-members, members of pliant elastic material interposed between the sides of the girder and the said lever-members, and means for locking the said lever-members in compressing bearing relation onto the said pliant elastic members, whereby the rib is enabled to resiliently rock about the spar in any direction.

15. In a non-rigid wing for an airplane, in combination: a girder, a rib mounted on said girder in transverse relation thereto, the said rib including web-portions positioned in spaced relation to each other and combined to spacedly encompass said girder, lever-members having pivoted mounting in said web-portions, members of pliant elastic material interposed between the sides of the girder and the said lever-members, and adjustable means for locking the said lever-members in compressing bearing relation onto the said pliant elastic members, whereby the rib is enabled to rock about the girder in any direction and to any desired extent.

16. In a non-rigid wing for an airplane, in combination: a plurality of girders, a bridge-member transversely mounted on all said girders, the said bridge-member including web-portions positioned in spaced relation to each other and combined to spacedly encompass each girder, movable bearing-members having mounting in the said web-portions, members of pliant elastic material interposed between the sides of each girder and the respective web-portions, and adjustable means for locking the said movable bearing-members in any desired compressing bearing relation onto the said pliant elastic members whereby the bridge-member is enabled to resiliently rock about the combined girders in any direction and to any desired extent.

17. A composite spar for a non-rigid airplane structure comprising: the combination with a plurality of component spar-members of unitary construction and of substantially equal lengths united in spaced parallelism, the said spar-members being composed of materials possessing inherent characteristics of tensile strength, elasticity, resilience, and area of hysteresis-loop, the said spar-members in their spaced combination having a characteristic natural frequency of vibration determined by their cross-sectional configuration, the said combined spar-members tending to vibrate at said characteristic frequency under loads of abruptly fluctuating magnitudes, of means for modifying and damping the said vibrations, said means comprising a collation of component spar-members interposed between and in contact with said first-named spar-members, the said last-named spar-members being likewise of unitary construction and of substantially the same length as the first-named spar-members, the said last-named spar-members being composed of materials characterized as to tensile strength, elasticity, and resilience, all to a relatively less degree than that of the first-named spar-members, and being also characterized by hysteresis-loops of relatively larger area than that of the first-named spar-members, the said comparative hysteresis characteristics furthering progressive damping of the vibrations of the last-named spar-members with attendant interference in and induced damping of the vibrations of the first-named spar-members; a plurality of spacedly disposed means clampingly uniting all said first- and second-named component spar-members so that relative spontaneous displacement between any of said component spar-members is frictionally prevented; and end-pieces rigidly uniting the extremities of all said component spar-members.

18. A composite spar for a non-rigid airplane structure comprising: the combination with two component spar-members of unitary construction and of substantially equal lengths united in spaced parallelism, the said spar-members being composed of materials possessing inherent characteristics of tensile strength, elasticity, resilience, and area of hysteresis loop, the said component spar-members in their spaced combination having a characteristic natural frequency of vibration as determined by their cross-sectional configuration, the said combined spar-members vibrating at the said characteristic frequency under loads of abruptly fluctuating magnitudes, of means for modifying and damping the said vibrations, said means comprising a component spar-member of unitary construction and of equal length as the first-named spar-members, the said last-named spar-member being interposed and contacting the first named spar-members, the said last-named spar-member being composed of material characterized as to tensile strength, elasticity, and resilience, all to a less degree than that of the first-named spar-members and being also characterized by a hysteresis loop of relatively larger area than that of the first-named spar-members, said comparative hysteresis characteristics furthering the progressive damping of the vibrations of the last-named spar-member with attendant interference in and induced damping of the vibrations of the first-named members; a plurality of spacedly disposed means clampingly uniting all said spar-members so that relative spontaneous displacement between any of said members is frictionally prevented; and end-pieces rigidly uniting the extremities of all said spar-members.

19. A composite spar for a non-rigid airplane structure comprising: the combination with a main spar-member of unitary construction composed of a material possessing inherent characteristics of resistance to fracture, elasticity, resilience, and area of hysteresis-loop and possessing a natural frequency of vibration as determined by its cross-sectional conformation, the said spar-member vibrating at said frequency under loads of abruptly fluctuating magnitudes, of means for modifying and damping the said vibrations, said means comprising a second spar-member of unitary construction and of equal length as the main spar-member, the said last-named spar-member being composed of material characterized as to tensile strength, elasticity and resilience all to a less degree than the main spar-member and being also characterized by a hysteresis-loop area relatively larger than that of the main-spar, said comparative hysteresis characteristics furthering progressive damping of the vibrations of the second-named spar-member with attendant interference in and progressive damping of the vibrations of the main spar-member; a plurality of spacedly disposed means clampingly uniting both said spar-members so that relative displacement between said spar-members is frictionally prevented; and end-pieces rigidly uniting the extremities of both said spar-members.

20. A composite spar for a non-rigid airplane structure, comprising: the combination with a plurality of component spar-members of unitary construction, all of substantially equal length and united in spaced parallelism, the said spar-members being composed of materials possessing inherent characteristics of tensile strength, elasticity, resilience, and area of hysteresis-loops, the said spar-members in their spaced combination having a natural frequency of vibration as determined by their sectional configuration, the said combined spar-members tending to vibrate at said natural frequency under loads of abruptly fluctuating magnitudes, of means for modifying and damping the said vibrations, said means comprising a component spar-member interposed between and in contact with said first-named component spar-members, the said second named member being of substantially the same length as the first-named spar-members, said second named spar-member being composed of a material characterized as to resistance to fracture, elasticity and resilience, all to a relative less degree than the first-named spar-members, and being also characterized by an area of hysteresis loop relatively larger than that of the first-named spar-members, the said comparative hysteresis characteristics furthering progressive damping of the vibrations of the last-named spar-member with attendant interference in and induced damping of the vibrations of said first-named spar-members; a plurality of spacedly disposed means clampingly uniting all said component spar-members so that relative displacement between any of said spar-members is frictionally prevented; and end-pieces rigidly uniting the extremities of all said component spar-members.

21. A composite spar for a non-rigid airplane structure comprising: the combination with a plurality of component spar-members of metallic material all of substantially equal length and united in spaced parallelism, the said metallic material possessing inherent characteristics of tensile strength, elasticity, resilience, and area of hysteresis-loop, the said component spar-members in their spaced combination having a characteristic resistance to fracture and a natural frequency of vibration as determined by their cross-sectional configuration, the said combined spar-members tending to vibrate at said natural frequency under loads of abruptly fluctuating magnitudes, of means for modifying and damping the said vibrations, said means comprising a collation of component spar-members of non-metallic material of substantially the same length as the non-metallic members, the said collation of non-metallic members being interposed between and in contact with said metallic spar-members, the said non-metallic members being characterized as to resistance to fracture, elasticity, and resilience all to a less degree than the metallic members and being also characterized by an area of hysteresis-loop relatively larger than that of the metallic members, said comparative hysteresis characteristics furthering progressive damping of the vibrations of said non-metallic members with attendant interference in and induced damping of the vibrations of the metallic members; a plurality of spacedly disposed means clampingly uniting all said metallic and non-metallic spar-members so that relative displacement between any of said spar-members is frictionally prevented; and end-pieces rigidly uniting the extremities of all said component spar-members.

22. A composite spar for a non-rigid airplane structure comprising: the combination with a plurality of tubular members of metallic material, all of substantially equal length, and united in spaced parellelism, the said metallic material possessing inherent characteristics of tensile strength, elasticity, resilience, and area of hysteresis-loop, the said metallic tubular members in their spaced combination having a characteristic resistance to fracture and a natural frequency of vibration as determined by their cross-sectional configuration, the said combined tubular members tending to vibrate at the said natural frequency under loads of abruptly changing magnitudes, of means for modifying and damping the said vibrations, said means comprising a collation of component spar-members of non-metallic material of substantially the same length as the metallic tubular members, the said collation of non-metallic members being interposed between and in contact with the said spaced metallic tubular members, the said non-metallic material being characterized as to resistance to fracture, elasticity, and resilience, all to a less degree than said metallic material and being also characterized by an area of hysteresis-loop relatively larger than that of the metallic material of the tubular members, said comparative hysteresis characteristics furthering progressive damping of the vibrations of the said non-metallic members with attendant interference in and induced damping of the vibrations of the metallic tubular members; a plurality of spacedly disposed means clampingly uniting all said tubular and non-metallic members so that relative displacement between any of said members is frictionally prevented; and end-pieces rigidly uniting the extremities of all said metallic and non-metallic members.

23. A composite spar for a non-rigid airplane structure comprising: the combination with two tubular component spar-members of metallic material of substantially equal length united in spaced parallelism, the said metallic material possessing inherent characteristics of tensile strength, elasticity, resilience, and area of hysteresis loop, the said metallic tubular spar-members in combination having a characteristic resistance to fracture and a natural frequency of vibration as determined by their cross-sectional configuration, the said united tubular spar-members tending to vibrate at their natural frequency under loads of abruptly fluctuating magnitudes, of means for modifying and damping said vibrations, said means comprising a component spar-member of non-metallic material and of substantially the same length as the metallic tubular members, the said non-metallic spar-member being interposed between and in contact with said metallic tubular members, the said non-metallic material being characterized as to tensile strength, elasticity, and resilience all to a less degree than that of the metallic material, and being further characterized by an area of hysteresis loop relatively larger than that of the metallic material, the said comparative hysteresis characteristics furthering progressive damping of the vibrations of said non-metallic member with attendant interference in and induced damping of the vibrations of the said metallic tubular spar-members; a plurality of spacedly disposed means clampingly uniting all metallic and non-metallic members so that relative displacement between any of said component spar-members is frictionally prevented; and end-pieces rigidly uniting the extremities of all said component spar-members.

JOHN D. VAN VLIET.